United States Patent [19]

Hong

[11] Patent Number: 4,537,633
[45] Date of Patent: Aug. 27, 1985

[54] PORTLAND CEMENT, PROCESS FOR PREPARING SAME, AND COMPOSITIONS CONTAINING SAME

[75] Inventor: Won P. Hong, Chungnam, Rep. of Korea

[73] Assignee: Suh Kyung Suk, Seoul, Rep. of Korea

[21] Appl. No.: 503,107

[22] Filed: Jun. 10, 1983

[30] Foreign Application Priority Data

Feb. 2, 1983 [KR] Rep. of Korea .................. 83-396

[51] Int. Cl.³ .................. C04B 7/04; B32B 13/00
[52] U.S. Cl. .................. 106/96; 106/97
[58] Field of Search ............ 106/96, 97, 102, 281 R, 106/284; 428/484

[56] References Cited

U.S. PATENT DOCUMENTS

| 2,198,800 | 4/1940 | Badollet | 106/96 |
| 2,210,367 | 8/1940 | Halbach | 106/96 |
| 2,609,882 | 9/1952 | Morgan et al. | 106/97 |
| 3,010,840 | 11/1961 | Goff et al. | 106/97 |
| 3,713,856 | 1/1973 | McConnaughay | 106/97 |

FOREIGN PATENT DOCUMENTS

534731  3/1941  United Kingdom .................. 106/97

Primary Examiner—Howard S. Williams
Attorney, Agent, or Firm—Sughrue, Mion, Zinn, Macpeak, and Seas

[57] ABSTRACT

An improved Portland cement composition and process for producing same comprising dry powder of Portland cement and very fine particles of carbon black, wherein the dry powder of Portland cement is coated with an asphalt film prior to the addition of the carbon black.

18 Claims, 5 Drawing Figures

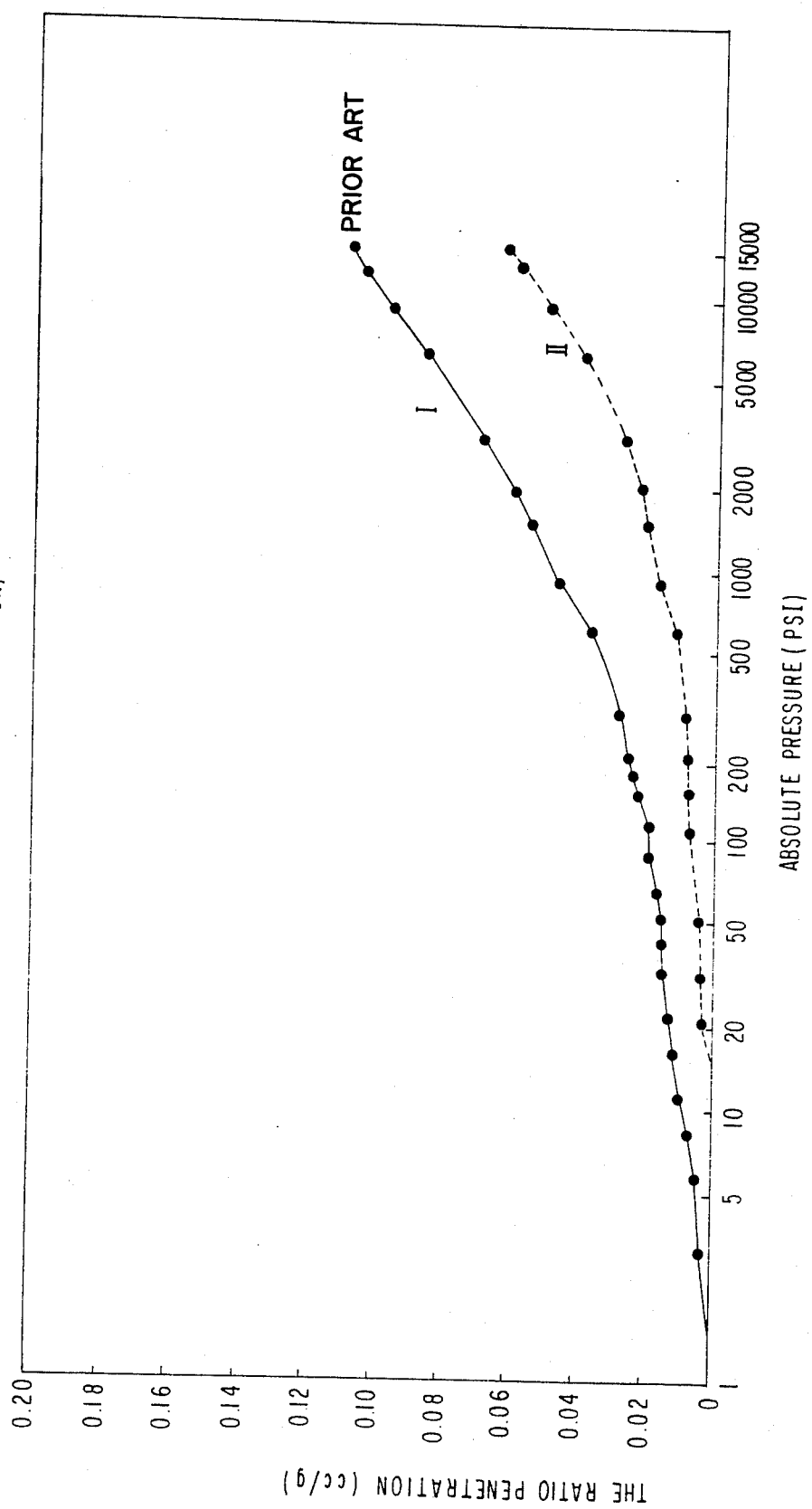

PORTLAND CEMENT, PROCESS FOR PREPARING SAME, AND COMPOSITIONS CONTAINING SAME

FIELD OF THE INVENTION

The present invention relates to an improved Portland cement, a method for preparing same, and compositions containing same.

BACKGROUND OF THE INVENTION

Improvements in waterproofing, compressive strength, durability, duration of packing during storage and other properties of Portland cement have been disclosed in U.S. Pat. Nos. 1,134,573; 1,772,999; 913,794; 1,076,028; and 1,305,645.

U.S. Pat. No. 1,134,573 relates to a method and means of producing an admixture by adding lime or bentonite to asphaltum oil or asphalt and mixing it with ordinary cement, water and aggregates to produce concrete or mortar. However, with the resulting concrete or mortar there may be partial leakage and the compressive strength, workability and duration of storage may not be preserved because the hydrophobic admixture has to be mixed with the unimproved traditional cement.

U.S. Pat. No. 1,772,999 relates to a process of producing an admixture by mixing diatomaceous earth or bentonite with mineral oil or animal oil, and coating Portland cement therewith. Further, this reference relates to a method for the production of an emulsion by mixing calcium chloride aqueous solution, which is used as a setting accelerator for concrete, with asphalt-dissolved crude oil mixed with bentonite or Fuller's earth. However, the quality of the resulting composition is not uniform because the admixture is made of natural oil and mineral material which are impure and weak in hardness as to decrease the strength and workability thereof. In addition, there may be more cracks in the concrete with an increase in the heat of hydration. Moreover, the reinforcing bars in the concrete can become corroded by the corrosive property of the calcium chloride.

U.S. Pat. No. 913,794 relates to a method for producing a waterproof cement by coating the cement particles with a mixture obtained by admixing lime with an oleaginous substance without heating. However, the workability and waterproofing strength in the resulting concrete may be decreased because no pore filler is used for the cement other than wax and an oleaginous substance with lime.

U.S. Pat. No. 1,076,028 relates to a method for coating cement particles by passing the dry cement powder through a spray zone of a molten state of fatty acid soap or wax. However, the strength, waterproofing and workability of the resulting concrete is decreased because the cement is coated while it is forced through the spray zone.

U.S. Pat. No. 1,305,645 relates to a method for mixing cement with pitch powder pulverized below 100 mesh. However, there is a decrease in workability, strength and waterproofing in the resulting concrete because pitch has to be admixed with the cement during concreting.

The disadvantages of using ordinary Portland cement in producing concrete or mortar are discussed below.

In the conventional mixing of concrete or mortar with ordinary Portland cement, there must be a surplus of water, compared with the necessary amount of water used for hydration of cement, in order to enhance workability. Further, since air entraining necessarily occurs in concrete mixing, the surplus of water combined with the air entraining produces a lot of pore during hydration and setting. When the pores are interconnected, undesired leakage can occur.

In addition, the concrete or mortar formed with ordinary Portland cement has the problem of cracking due to the shrinkage and expansion caused by the heat of hydration and variations of the surrounding temperatures during and after hardening. These cracks are undesirable because they result in leakage.

Moreover, the conventional reinforced concrete using ordinary Portland cement has a drawback in that it creates a water pool beneath the aggregates or the horizontal reinforcing bars due to bleeding. This produces more pores and cracking under the heat of hydration.

Also, in the mixing of concrete or mortar with ordinary Portland cement, it is very difficult to keep a low water-content ratio, due to poor workability, unless air entraining admixtures are used.

Further, the concrete produced using ordinary Portland cement does not have satisfactory compressive strength after long periods of time.

In addition, ordinary Portland cement is highly water absorbent. This causes storage problems and results in hardening.

Moreover, additional waterproofing processes are required for concrete structures made with ordinary Portland cement. Not only is this very costly but also such processes cannot be used in a pressured area.

The durability of a reinforced concrete structure is closely related to the neutralization of the concrete material and corrosion of the reinforcing bars. After setting, if the alkalinity of the concrete is lost by the action of surface air or water, which contains carbon dioxide and sulfur dioxide, the concrete is neutralized. This causes corrosion of the reinforcing bars and destruction of the concrete.

SUMMARY OF THE INVENTION

Accordingly, one object of the present invention is to provide an improved Portland cement which does not require a surplus of water when mixing concrete or mortar compared with the necessary amount of water used for hydration of ordinary Portland cement.

Another object of the present invention is to provide an improved Portland cement, when used to form concrete or motor, that does not result in a cracking problem due to shrinkage and expansion caused by the heat of hydration and variations of the surrounding temperatures during and after hardening.

A further object of the present invention is to provide an improved Portland cement, when used to form concrete or mortar, that does not create a water pool beneath the aggregates or the horizontal reinforced bars due to bleeding.

Even another object of the present invention is to provide an improved Portland cement wherein a low water-cement ratio can be maintained when mixing concrete or mortar without using air entraining admixtures therewith.

Also an object of the present invention is to provide an improved Portland cement, when used to form concrete or mortar, that results in improved compressive strength over the course of time.

Another object of the present invention is to provide an improved Portland cement which is not highly absorbent to moisture and consequently does not result in storage problems.

Additionally, an object of the present invention is to provide an improved Portland cement, when used to form concrete or mortar, that does not require the use of additional waterproofing processes for the concrete structures made therewith.

Further, an object of the present invention is to provide an improved Portland cement, when used to form concrete or mortar, that does not cause corrosion of the reinforcing bars.

An additional object of the present invention is to provide a process for producing the improved Portland cement of the present invention.

The above-described objects of the present invention have been met in one embodiment by a Portland cement composition comprising a homogeneous mixture of (1) particles of Portland cement, whose surface is coated with a film of asphalt,
(2) fine particles of carbon black, and
(3) optionally, gypsum.

In another embodiment, this invention provides a method for producing the Portland cement composition described above comprising coating an asphalt film on the surface of Portland cement particles, which has been admixed with gypsum if desired, and then homogeneously mixing very fine particles of carbon black with the Portland cement coated with the ashalt film.

BRIEF DESCRIPTION OF THE FIGURES

FIG. 2 represents a porosity determination of concrete containing ordinary Portland cement (I) and concrete containing Portland cement of the present invention (II).

DETAIL DESCRIPTION OF THE INVENTION

The first step of the manufacturing process of the present invention is to form thin films of hydrophobic asphalt around the surface of particles of ordinary Portland cement dry powder. Optionally, gypsum may have been admixed with the Portland cement dry powder if desired.

Next, very fine particles of carbon black, having a diameter less than 70 millimicrons are added to the asphalt-filmed cement powder particles and blended into a homogeneous mixture.

The improved Portland cement of the present invention can be used just like ordinary Portland cement in producing concrete or mortar. Further, the improved Portland cement of the present invention provides excellent waterproofing in 28 days without utilizing conventional waterproofing methods.

The asphalt employed in the present invention is hydrophobic and plastic under heat. Further, the asphalt gains good fluidity above the softening point, but loses fluidity and is transformed into an elastic solid state below the softening point. The heat plasticity of the asphalt is primarily used to form the asphalt film around the particles of cement powder.

The asphalt is heated into a molten state and it is added to the cement dry powder in an amount of 0.1–2% by the weight of the cement. After blending the asphalt with the cement, the heat is maintained between 100° C. to 150° C. with agitation. In this manner, the liquefied asphalt forms a very thin film around the particles of the cement dry powder.

The asphalt to be used in the present invention should have a softening point between 40° to 90° C. and can be either straight asphalt or blown asphalt.

Carbon black having a diameter less than 70 millimicrons is added to the filmed particles and agitated to form a homogeneous mixture.

The concrete or mortar formed with cement of the present invention is tight enough to be waterproof under high water pressure even at 15 kg/cm$^2$ after 28 days of curing.

With concrete containing cement of the present invention some of the pores that occur during hydration are filled by the very thin asphalt film and the very fine carbon black (less than 70 millimicrons in diameter).

Figure 1A:
FIG. 1a is a photograph taken under a metallurgical microscope of concrete containing ordinary Portland cement.
Figure 1B:
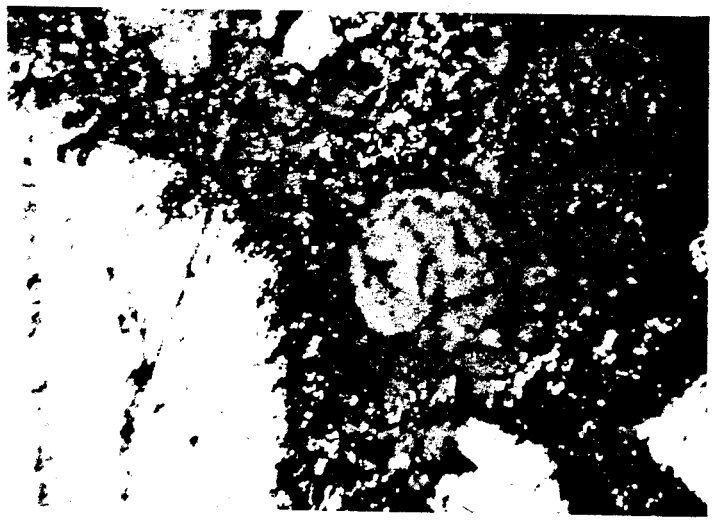
FIG. 1b is a photograph taken under a metallurgical microscope of concrete containing Portland cement of the present invention.

As shown in FIGS. 1a and 1b, the leakage through the pore network is prevented due to the hydrophobic asphalt and carbon black. That is, FIG. 1a represents a photograph of concrete made with ordinary Portland cement and FIG. 1b represents a photograph of concrete made with the Portland cement of the present invention.

The above described porosity effect is further demonstrated in FIG. 2. That is, FIG. 2 demonstrates that the porosity is larger in concrete containing ordinary Portland cement, whereas it is much smaller in the concrete containing Portland cement of the present invention in terms of both the number and the diameter of developed pores. Hence, concrete on mortar containing the cement of the present invention has excellent waterproofing properties, even under water pressure as high as 15 kg/cm$^2$.

In concrete or mortar containing Portland cement of the present invention, the asphalt prevents water leakage through the pores. When the temperature of the concrete rises due to the heat of hydration or changes in the surrounding temperature, the asphalt absorbs the heat and it softens. When the temperature falls, the asphalt resumes its solid state.

Another role of the asphalt in the present invention is to resist cracking. The asphalt film interrupts the movement of water through the pores in the concrete. This results in much less cracking and thus, enhances the waterproofing property thereof.

Figure 3A:
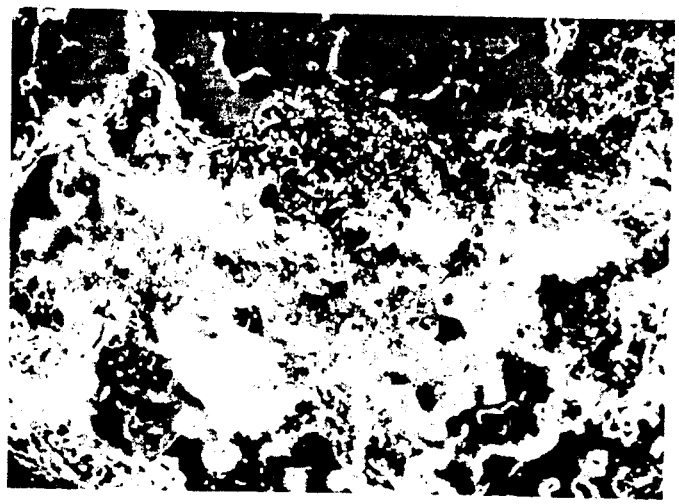
FIG. 3a represents an electrophotomicrograph of concrete containing ordinary Portland cement.
Figure 3B:
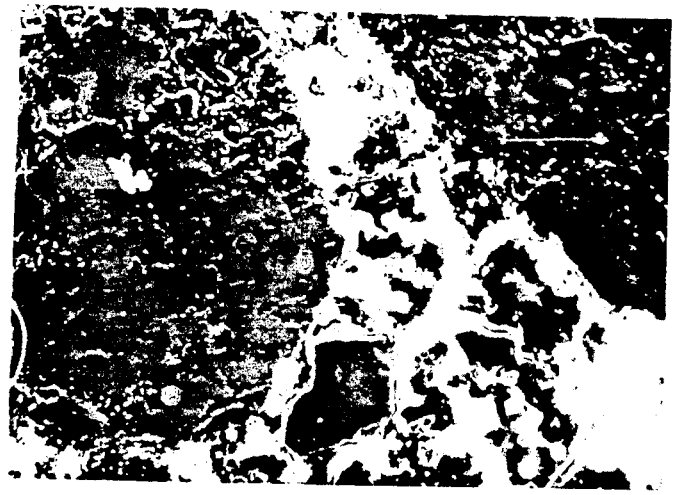
FIG. 3b represents an electrophotomicrograph of concrete containing Portland cement of the present invention.

FIG. 3a and 3b illustrate electron micrographs of hardened concrete containing ordinary Portland cement (3a) and Portland cement of the present invention (3b). These figures show that the cement of the present invention provides excellent results in preventing cracks from interconnecting. This is because concrete containing Portland cement of the present invention has fewer and shorter cracks than concrete containing ordinary Portland cement.

As stated above, the Portland cement of the present invention contains carbon black having a diameter less than 70 millimicrons and is very light in weight. The specific gravity of the cement and carbon black is about 3.2 and 1.8, respectively. The carbon black acts as a dispersing agent in addition to acting as a pigment. These properties bring about an improved workability of the resulting cement. Accordingly, in the construction field, the concrete formed using cement of the present invention enhances working conditions and the stability of the waterproofing structure.

Numerous specimens of concrete have been prepared at various water/cement ratios ranging from 60 to 45% by weight with the various slumps ranging from 18 to 8 centimeters. No leakage was found in these specimens. Some of the specimens were molded into three 24 hour stages and cured for 28 days at room temperature. The test results indicated that no leakage occurred under a continuing pressure of 15 kg/cm$^2$ over the course of one week.

Hence, the Portland cement of the present invention improves workability and water tightness of the concrete as a result of the characteristics of the micro asphalt coating and carbon black. Further, the Portland cement of the present invention acts to more firmly join together the part of the stage placement which is inserted into the entire concrete.

Although the compressive strength of the 28 day aged concrete containing Portland cement of the present invention is slightly weaker, i.e., 4-6% weaker, than that containing ordinary Portland cement, concrete containing Portland cement of the present invention is 10-25% stronger after 40 days than that containing ordinary Portland cement. This is due to the phenomenon that even though the asphalt in the cement retards setting by absorbing the heat of hydration in the early stages, the carbon black improves water tightness over the course of time.

Concrete containing the Portland cement of the present invention not only exhibits water tightness, but also exhibits an anti-corrosion effect on the reinforcing bars because the hydrophobic asphalt film and chemically stable carbon black improve the water tightness and protect the concrete from corrosion. Once the asphalt in the concrete is softened by the heat of hydration and then returns to a solid state it provides very close adherence around the reinforcing bars. This also protects the reinforcing bars from corrosion.

Several tests have been conducted which show that the concrete containing the Portland cement of the present invention produces a 10-50% increase in the adhesive strength of the reinforcing bars compared with ordinary Portland cement. Thus, the Portland cement of the present invention gives rise to a more durable reinforced concrete structure.

Since the concrete containing the Portland cement of the present invention consists of particles covered with a hydrophobic asphalt film, the concrete can be stored for longer periods of time without solidification.

In addition, since with concrete containing the Portland cement of the present invention no leakage occurs at the high pressure of 15 km/cm$^2$, there is no need for additional waterproofing.

The Portland cement of the present invention can be used from both an economical and technical standpoint in a variety of construction works including subways, tunnels, dams, and substructures of buildings.

The present invention is illustrated by the following examples. The examples are in no way intended to limit the scope of the present invention.

The asphalt used in the examples below had a softening point of 40°-90° C. The carbon black used in the examples below had a diameter of less than 70 millimicrons.

EXAMPLE 1

A Portland cement comprising 99.6% by weight dry powder of ordinary Portland cement clinker, 0.2% asphalt by weight (straight asphalt and blown asphalt, respectively) and 0.2% by weight carbon black.

EXAMPLE 2

A Portland cement comprising 97.5% by weight dry powder of ordinary Portland cement clinker, 1% by weight asphalt (straight asphalt and blown asphalt, respectively) and 1.5% by weight carbon black.

EXAMPLE 3

A Portland cement comprising 99% by weight dry powder of ordinary Portland cement clinker, 0.5% by weight asphalt (straight asphalt and blown asphalt, respectively) and 0.5% by weight carbon black.

EXAMPLE 4

A Portland cement comprising 97.3% by weight dry powder of ordinary Portland cement clinker, 2% by weight gypsum, 0.2% by weight asphalt (straight asphalt and blown asphalt, respectively) and 0.5% by weight carbon black.

EXAMPLE 5

A Portland cement comprising 92.5% by weight dry powder of ordinary Portland cement clinker, 5% by weight gypsum, 1% by weight asphalt (straight asphalt and blown asphalt, respectively) and 1.5% by weight carbon black.

EXAMPLE 6

A Portland cement comprising 95.8% by weight dry powder of ordinary Portland cement clinker, 3% by weight gypsum, 0.5% by weight asphalt (straight asphalt and blown asphalt, respectively) and 0.7% by weight carbon black.

COMPARATIVE EXAMPLE 1

A Portland cement comprising 99.8% by weight dry powder of ordinary Portland cement clinker and 0.2% by weight carbon black.

COMPARATIVE EXAMPLE 2

A Portland cement comprising 98% by weight of dry powder of ordinary Portland cement clinker and 2% by weight carbon black.

COMPARATIVE EXAMPLE 3

A Portland cement comprising 99% by weight dry powder of ordinary Portland cement clinker and 1% by weight carbon black.

COMPARATIVE EXAMPLE 4

A Portland cement comprising 97.8% by weight dry powder of ordinary Portland cement clinker, 2% by weight gypsum, and 0.2% by weight carbon black.

COMPARATIVE EXAMPLE 5

A Portland cement comprising 93% by weight dry powder of ordinary Portland cement clinker, 5% by weight gypsum and 2% by weight carbon black.

COMPARATIVE EXAMPLE 6

A Portland cement comprising 96.4% by weight dry powder of ordinary Portland cement clinker, 3% by weight gypsum and 0.6% by weight carbon black.

Examples 1-3 were prepared in the following manner:

A dry powder of Portland cement clinker was obtained by pulverization of Portland cement clinker. Thereafter, molten or powdered asphalt was added to the dry powder and the resulting mixture was heated and agitated in a kettle with heating and agitation devices at 100°-150° C. (straight asphalt 100°-120° C., or blown asphalt 130°-150° C.) and a pressure of 1 atm, for 2 hours. The resulting mixture was cooled to room temperature to obtain the asphalt filmed Portland cement particles. Then, carbon black was added to the asphalt filmed Portland cement powder and agitated until homogeneously mixed therewith.

Examples 4-6 were prepared in the same manner as Examples 1-3 except that gypsum was admixed with the dry powder of Portland cement clinker prior to the addition of the asphalt.

Comparative Examples 1-3 were prepared in the following manner:

A dry powder of ordinary Portland cement clinker was obtained by pulverization. Thereafter, carbon black was admixed with the cement dry powder at room temperature until a homogeneous mixture was produced.

Comparative Examples 4-6 were prepared in the same manner as Comparative Examples 1-3 except that gypsum was also admixed with the cement dry powder and carbon black.

Concrete containing the cements of Examples 1-6 and Comparative Examples 1-6 were measured for compressive strength, water permeability at 15 kg/cm$^2$ and adhesive strength of the reinforced bars by conventional methods. The results are shown in Table A, below.

TABLE A

| Cement | Compressive Strength aged 28 days | Compressive Strength aged 40 days | Water Permeability (15 kg/cm$^2$/week) aged 28 days | Adhesive Strength to Reinforcing Bar |
|---|---|---|---|---|
| Examples 1-6 | | | | |
| Straight Asphalt | 94-96% | 100-110% | 0% | 110-120% |
| Blown Asphalt | 96-98% | 110-125% | 0% | 130-150% |
| Comparative Examples 1-6 | 100% | 100% | 100% | 100% |

While the present invention has been described in detail and with reference to specific embodiments thereof, it would be apparent to one skilled in the art that various changes and modifications can be made therein without departing from the spirit and scope thereof.

I claim:

1. A Portland cement composition comprising
   (1) dry powder of Portland cement, whose surface is coated with an asphalt film, and
   (2) particles of carbon black.
2. A Portland cement composition as in claim 1, wherein said asphalt film comprises a film of straight asphalt or blown asphalt.
3. A concrete composition comprising the Portland cement composition of claim 2, and aggregates.
4. A Portland cement composition as in claim 2, wherein said asphalt has a softening point between 40°-90° C.
5. A concrete composition comprising the Portland cement composition of claim 4, and aggregates.
6. A Portland cement composition as in claim 4, wherein said asphalt is present in an amount of 0.2 to 1% by weight.
7. A concrete composition comprising the Portland cement composition of claim 6, and aggregates.
8. A Portland cement composition as in claim 1, wherein said carbon black has a particle diameter of 70 millimicrons or less.
9. A concrete composition comprising the Portland cement composition of claim 8, and aggregates.
10. A Portland cement composition as in claim 5, wherein said carbon black is present in an amount of 0.2 to 1.5% by weight.
11. A concrete composition comprising the Portland cement composition of claim 10, and aggregates.
12. A Portland cement composition as in claim 1, wherein gypsum is present in said Portland cement in an amount of 2 to 5% by weight.
13. A concrete composition comprising the Portland cement composition of claim 12, and aggregates.
14. A concrete composition comprising the Portland cement composition of claim 1, and aggregates.
15. A method for preparing a Portland cement composition comprising the steps of:
   (a) adding molten or powdered asphalt to a dry powder of Portland cement;
   (b) heating and agitating the mixture of step (a) at 100° to 150° C.;
   (c) cooling the product of step (b) to room temperature;
   (d) admixing the resulting asphalt filmed Portland cement particles of step (c) with carbon black and agitating until a homogeneous mixture is produced.
16. A method for producing a Portland cement composition as in claim 15, wherein said asphalt is straight asphalt and said heating and agitating in step (b) is conducted at 100° to 120° C.
17. A method of producing a Portland cement composition as in claim 15, wherein said asphalt is blown asphalt and said heating and agitating in step (b) is conducted at 130° to 150° C.
18. A method for producing a Portland cement composition as in claim 15, wherein gypsum is present in the dry powder of Portland cement of step (a) prior to the addition of said asphalt.

* * * * *